(12) United States Patent
Katsurahira (10) Patent No.: US 8,368,669 B2
(45) Date of Patent: Feb. 5, 2013

(54) POSITION DETECTING DEVICE AND COMPUTER INCLUDING THE SAME

(75) Inventor: Yuji Katsurahira, Saitama (JP)

(73) Assignee: WACOM Co., Ltd, Saitama-ken (JP)

( * ) Notice: Subject to any disclaimer, the term of this patent is extended or adjusted under 35 U.S.C. 154(b) by 1079 days.

(21) Appl. No.: 11/723,956

(22) Filed: Mar. 22, 2007

(65) Prior Publication Data

US 2007/0227785 A1    Oct. 4, 2007

(30) Foreign Application Priority Data

Mar. 23, 2006 (JP) ................. 2006-081605

(51) Int. Cl.
*G06F 3/033* (2006.01)
*G06F 3/041* (2006.01)
*G06F 3/045* (2006.01)
*G06F 3/046* (2006.01)
*G09G 5/00* (2006.01)
*G09G 5/08* (2006.01)
*G06K 11/06* (2006.01)
*G08C 21/00* (2006.01)

(52) U.S. Cl. ........ 345/179; 345/156; 345/157; 345/173; 345/174; 178/18.01; 178/18.03; 178/18.07; 178/19.01; 178/19.03; 178/20.01

(58) Field of Classification Search .................. 345/179; 455/41.1
See application file for complete search history.

(56) References Cited

U.S. PATENT DOCUMENTS

| | | | | |
|---|---|---|---|---|
| 5,007,085 A | * | 4/1991 | Greanias et al. ................ 726/34 |
| 5,682,019 A | * | 10/1997 | Katsurahira et al. ....... 178/18.07 |
| 5,973,677 A | * | 10/1999 | Gibbons ....................... 345/179 |
| 6,002,387 A | * | 12/1999 | Ronkka et al. ................. 345/157 |
| 6,476,799 B1 | * | 11/2002 | Lee et al. ...................... 345/174 |
| 6,930,674 B2 | * | 8/2005 | Katsurahira .................. 345/173 |
| 7,113,175 B2 | * | 9/2006 | Liu et al. ..................... 345/173 |
| 7,471,201 B2 | * | 12/2008 | Ono .......................... 340/572.1 |
| 2005/0128191 A1 | * | 6/2005 | Katsurahira et al. .......... 345/179 |
| 2006/0113955 A1 | * | 6/2006 | Nunally ....................... 320/108 |

FOREIGN PATENT DOCUMENTS

| | | |
|---|---|---|
| JP | 06-139001 | 5/1994 |
| JP | 06-187086 | 7/1994 |
| JP | 2002-032192 | 1/2002 |

OTHER PUBLICATIONS

English abstract of JP 06-187086 (Jul. 8, 1994).
English abstract of JP 06-139001 (May 20, 1994).
English abstract of JP 2002-032192 (Jan. 31, 2002).

* cited by examiner

*Primary Examiner* — Sumati Lefkowitz
*Assistant Examiner* — David Tung
(74) *Attorney, Agent, or Firm* — Berenato & White, LLC (57) ABSTRACT

A position detecting device is provided. The position detecting device includes a position pointer which transmits a position-pointing signal using a power supply stored in a rechargeable power storage unit, and a tablet which detects a position pointed to by the position pointer when receiving the position-pointing signal. The position pointer includes a coil, a charging circuit for charging the power storage unit, and a transmitter for transmitting the position-pointing signal. The tablet includes an excitation coil wound around a periphery of a position detecting area of the tablet, an excitation circuit for supplying an alternating voltage to the excitation coil, a position-pointing signal detector for detecting the position-pointing signal received from the position pointer, and an excitation controller for controlling a supply of the alternating voltage to the excitation coil based on the detected position-pointing signal.

17 Claims, 7 Drawing Sheets

POSITION DETECTING DEVICE AND COMPUTER INCLUDING THE SAME

CROSS REFERENCES TO RELATED APPLICATIONS

The present application claims priority from Japanese Application No. P2006-081605 filed on Mar. 23, 2006, the entire contents of which are incorporated herein by reference.

FIELD OF THE INVENTION

The present invention relates to a position detecting device for detecting a position pointed to by a position pointer and a computer including the same. Particularly, when a rechargeable power storage unit is provided in the position pointer, the charge thereof can be easily recharged and conserved.

BACKGROUND OF THE INVENTION

Japanese Examined Patent Application Publication No. 02-53805 describes a position detecting device in which a reflective signal is transmitted by a position pointer in sync with a signal transmitted from a tablet where a loop coil is provided. The reflective signal is received by the loop coil in the tablet to detect a position.

Additionally, Japanese Published Patent Application No. 10-214148 describes a position detecting device in which a power supply unit is incorporated in a position pointer. In this case, signal transmission is performed using a power supply, which increases transmission power, enabling accuracy of the position detection operation to be improved. Transmission of other identification information and like may also be performed. In other words, a power supply is typically included in position pointers that transmit a signal to the loop coil in the tablet to detect a position.

For example, it is known to use an input device to input position information to a computer. The input device detects a position designated on a board called a "tablet/digitizer" and inputs the position information to the computer. In the tablet/digitizer, a position detecting device is used to detect the designated position. Here, various technologies have been developed for detecting the position designated on the board. For example, a position detecting device that uses an electromagnetic induction method has been determined to be efficient, because of a high degree of reliability and other advantages based on non-contact detection.

When the electromagnetic induction position detecting device is used, an alternating magnetic-field signal is transmitted from a loop coil provided in a tablet. The alternating magnetic-field signal is then tuned and received by a resonant circuit provided in a position pointer. In response, a resonant signal generated in the resonant circuit of the position pointer is transmitted from a coil of the resonant circuit of the position pointer back to the tablet. The resonant signal is then received by the same or a different loop coil in the tablet. A position designated by the position pointer is then detected from a waveform of the received signal. Therefore, the position designated can be detected while the tablet and the position pointer are not in contact with each other.

The electromagnetic induction position detecting device may alternatively include a position pointer having a power supply unit incorporated therein, and an oscillating circuit provided to increase transmitting power, thereby improving the reliability of position detection. Additionally, when a plurality of pointers are used, identification information can be transmitted to the tablet along with position information.

SUMMARY OF THE INVENTION

A power supply unit of a position pointer may be configured to be a rechargeable power supply unit such as an electric double-layer capacitor. As a result, an inconvenience associated with exchanging batteries is prevented.

However, even when the rechargeable power supply unit is used, the position pointer must typically be inserted into a separate charging device to charge the power supply unit of the position pointer. Here, the fact that a user must charge the position pointer in the charging device may result in an inconvenience.

In an effort to eliminate this inconvenience, the charging of the power supply unit may be performed with electric power of a signal received in a resonant circuit of the position pointer by using an alternating magnetic-field signal transmitted first from a loop coil. Specifically, in this charging process, since the charging is performed by supplying. an electromotive force of the resonant circuit of the position pointer to the charger, a user can charge the power supply unit more conveniently.

A thin display device such as a liquid crystal display (LCD) may include a screen that is also used as a surface of a tablet/digitizer, thereby enabling the display device and tablet/digitizer to be integrally formed. In this case, since a position of the position pointer can be detected using the electromagnetic induction method even when the position pointer is spaced apart from a surface of a position detecting device, the position detecting device is typically provided on a rear side of the display device. However, when the position detecting device is provided on the rear side of the display device, noise generated by a drive circuit (or other components) in the display device may interfere with the position detection operation.

On the other hand, it is possible to form a loop coil of the position detecting device with a transparent electrode such as an ITO (Indium-Tin-Oxide) film or the like. Accordingly, the loop coil formed with the transparent electrode may be provided on a display side of the display device. In this configuration, since the position detecting device is provided on the display side of the display device, the display device can be prevented from being disassembled in the production process and compatibility of the display device in the design stage can be increased. Thus, when the power supply unit is incorporated in the position pointer, transmitting power and accuracy of position detection operation can be increased.

However, since a resistance value of the ITO film is large, it may be difficult to transmit a large electric power using the alternating magnetic-field signal when the loop coil is formed of the transparent electrode such as ITO.

Also, when the loop coil is formed of a low-resistance member other than the ITO film, a transmit/receive operation can be performed by switching the loop coil at a high speed when the resonant signal is obtained within a typical range. However, it may be difficult to transmit a large electric power for charging the position pointer in a short time, and, as a result, another separate circuit may be necessary to perform the transmission operation of the electric power for charging the position pointer.

In view of the above design considerations, the present invention provides a position detecting device having a rechargeable position pointer with an improved structure.

The present invention also provides a position detecting device having a rechargeable position pointer which is recharged while a user uses the position pointer.

The position pointer does not require a battery exchange, and can be used without particular attention to an electric-charging operation such that a strong signal is transmitted with a simplified configuration.

Further, the present invention also provides a tablet having sensor coils arranged on a front surface of a liquid crystal panel.

Additional aspects of the present invention will be set forth in part in the description which follows and, in part, will be obvious from the description, or may be learned by practice of the invention.

The foregoing and/or other aspects and advantages of the present invention are achieved by providing a position detecting device which includes a position pointer that transmits a position-pointing signal using a power supply stored in a rechargeable power storage unit, and a tablet that detects a position pointed to by the position pointer when receiving the position-pointing signal. The position pointer includes a coil, a charging circuit for charging the power storage unit, and a transmitter for transmitting the position-pointing signal. The tablet includes an excitation coil wound around a periphery of a position detecting area, an excitation circuit for supplying an alternating voltage to the excitation coil, a position-pointing signal detector for detecting the position-pointing signal received from the position pointer, and an excitation controller for controlling a supply of the alternating voltage to the excitation coil based on the detected position-pointing signal.

Further, in the position detecting device the tablet may be formed integrally with a display device.

The excitation controller may supply the alternating voltage to the excitation coil when the position pointed to by the position pointer is within a predetermined distance range from the excitation coil.

The coil of the position pointer may receive a charging signal produced by the alternating voltage from the excitation coil of the tablet and may transmit the position pointing signal to the tablet.

The position pointer may include a resonant circuit configured with a coil and a capacitor.

The power storage unit of the position pointer may be an electric double-layer capacitor.

The foregoing and/or other aspects and advantages of the present invention are also achieved by providing a computer, including a position detecting device having a position pointer which transmits a position-pointing signal using a power supply stored in a rechargeable power storage unit, and a tablet which detects a position pointed to by the position pointer when receiving the position-pointing signal. The position pointer includes a coil, a charging circuit for charging the power storage unit, and a transmitter for transmitting the position-pointing signal. The tablet includes an excitation coil wound around a periphery of a position detecting area, an excitation circuit for supplying an alternating voltage to the excitation coil, a position-pointing signal detector for detecting the position-pointing signal received from the position pointer, and an excitation controller for controlling a supply of the alternating voltage to the excitation coil based on the detected position-pointing signal.

The computer may further include a display device being integrally formed with the tablet.

The excitation controller may supply the alternating voltage to the excitation coil when the position pointed to by the position pointer is within a predetermined distance range from where the excitation coil is arranged.

The coil of the position pointer may receive a charging signal produced by the alternating voltage from the excitation coil of the tablet and may transmit the position pointing signal to the tablet.

The position pointer may include a resonant circuit configured with a coil and a capacitor.

The power storage unit of the position pointer may be an electric double-layer capacitor.

The foregoing and/or other aspects and advantages are also achieved by providing a position detecting apparatus for detecting a position of a position pointer, the apparatus including a tablet having a plurality of conductors disposed on a surface thereof. The plurality of conductors include a plurality of detecting conductors to detect a position of the position pointer and at least one charging conductor to charge the position pointer.

The foregoing and/or other aspects and advantages are also achieved by providing a position detecting apparatus, including a tablet having electromagnetic detecting conductors arranged along a surface thereof, the electromagnetic detecting conductors interacting with a pointing device. The surface of the tablet includes a first region in which a position of the pointing device is detected and a second region in which the position of the pointing device is detected and a battery of the pointing device is recharged.

The foregoing and/or other aspects and advantages are also achieved by providing a position detecting apparatus, including a position pointer having a rechargeable power supply, and a tablet having a plurality of conductors disposed on a surface thereof. The plurality of conductors include a plurality of detecting conductors to detect a position of the position pointer based on a position signal of a first signal power received from the position pointer, and at least one charging conductor to charge the power supply of the position pointer by transmitting a charging signal of a second signal power to the position pointer, the second signal power being greater than the first signal power.

The foregoing and/or other aspects and advantages are also achieved by providing a position detecting apparatus, including a position pointer having a rechargeable power supply, and a tablet having a plurality of conductors disposed on a surface thereof, the plurality of conductors including a plurality of detecting conductors to detect a position of the position pointer and at least one charging conductor to charge the power supply of the position pointer when the position pointer is within a vicinity of the at least one charging conductor.

The foregoing and/or other aspects and advantages are also achieved by providing a pointing device usable with a position detecting apparatus having a tablet with a plurality of detecting conductors and at least one charging conductor. The pointing device includes a housing, a resonance circuit to transmit a position signal to the detecting conductors of the tablet and to receive a charging signal from the at least one charging conductor of the tablet, and a rechargeable battery to receive an electric current from the resonance circuit when the charging signal is being received.

The foregoing and/or other aspects and advantages are also achieved by providing a method of operating a position detecting apparatus including a position pointer having a rechargeable power supply and a tablet having a plurality of detecting conductors to detect a position of the position pointer and at least one charging conductor to charge the power supply of the position pointer. The method includes receiving a position signal from the position pointer at the detecting conductors, determining a position of the position pointer with respect to the tablet based on the received position signal, and transmitting a charging signal from the at least one charging conductor to the position pointer if it is determined that the position of the position pointer is within a predetermined distance from the at least one charging conductor.

According to embodiments of the present invention, a position detecting device and/or a computer include a rechargeable power storage unit provided in a position pointer such that an electric charging operation is performed by an excitation coil wound around a periphery of a tablet. Therefore, the position detecting device and computer can be used continuously in a normal use state without paying particular attention to the electric-charging operation. Further, there is no need to use/install a separate charger for the position pointer Additionally, there is no need to change a battery of the position pointer. Also, since a signal transmitted from the position pointer is received and detected by the tablet, the detected signal is prevented from being weak and the influence of noise can be avoided. Furthermore, since loop coil(s) used for detecting the position of the position pointer can be formed by a transparent material such as an ITO film or the like, a tablet sensor can be arranged on a front surface of the liquid crystal panel.

BRIEF DESCRIPTION OF THE DRAWINGS

These and/or other aspects and advantages of the present invention will become apparent and more readily appreciated from the following description of the embodiments, taken in conjunction with the accompanying drawings of which.

DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 1:
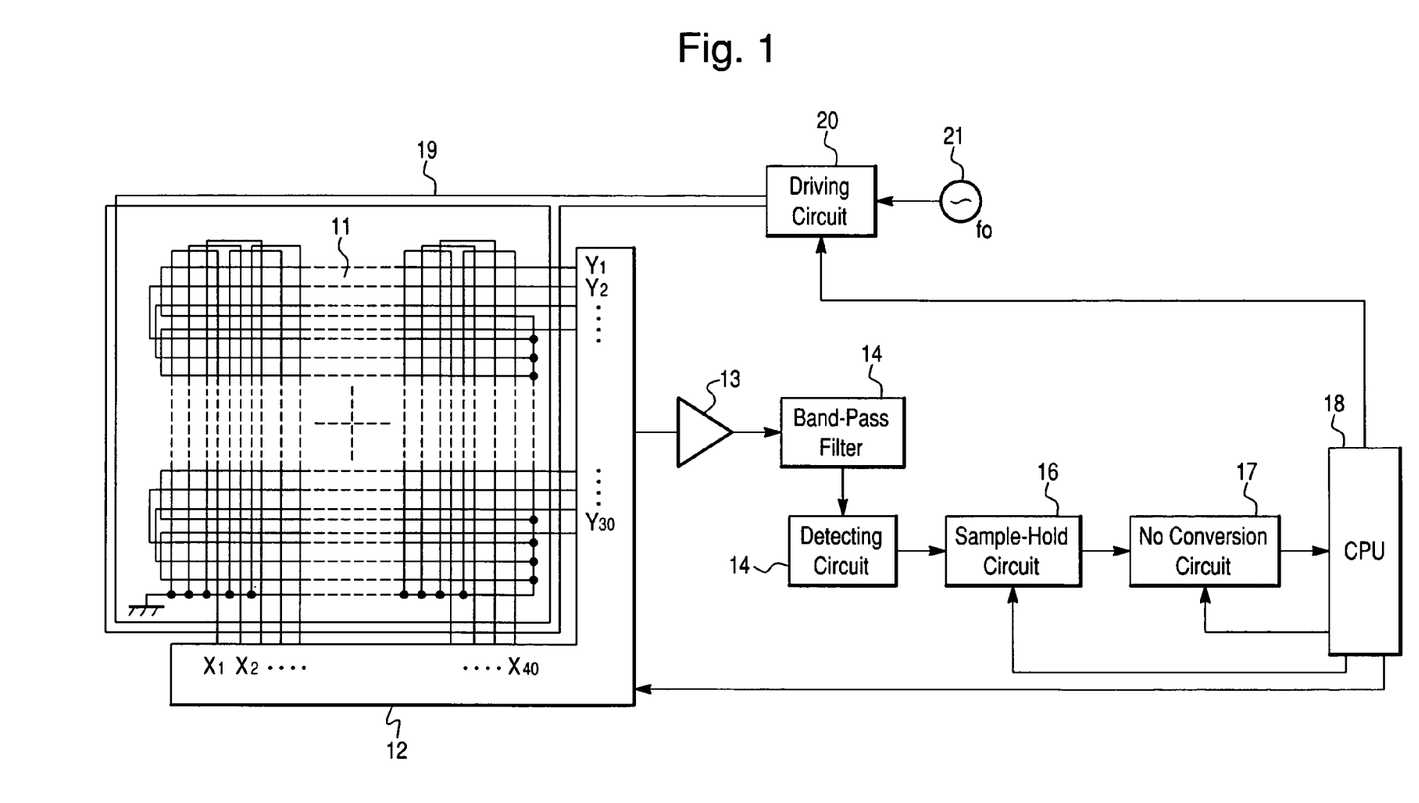
FIG. 1 is a block diagram including a schematic view illustrating a tablet associated with a position detecting device and computer according to an embodiment the present invention.

FIG. 1 is a block diagram including a schematic view illustrating a tablet associated with a position detecting device and computer according to an embodiment of the present invention.

FIG. 1 illustrates a loop-coil group 11 in which loop coils X1 to X40 and loop coils Y1 to Y30 are arranged along X-axis and Y-axis directions, respectively. A position detecting area configured with the loop-coil group 11 may be integrally formed with an LCD (Liquid Crystal Display) device (not shown in FIG. 1). A size and pitch of the loop-coil group 11 is determined such that the position detecting area corresponds to a display area of the LCD device. Further, the loop coils are connected to a selection circuit 12 that sequentially selects each of the loop coils.

An output terminal of the loop coils X1 to X40 and Y1 to Y30 is selected by the selection circuit 12 to be connected to an amplifying circuit 13. The amplifying circuit 13 is connected to a band-pass filter 14 having a center frequency f0. The band-pass filter 14 is connected to a detecting circuit 15. Further, the detecting circuit 15 is connected to a sample-hold circuit 16, and a voltage maintained by the sample-hold circuit 16 is transferred to an A/D (Analog to Digital) conversion circuit 17. Then, an output of the A/D conversion circuit 17 is provided to a CPU (Central Processing Unit) 18.

An excitation coil 19 is wound around a perimeter (periphery) of the position detecting area. It should be noted that although the excitation coil 19 is illustrated as having two turns in FIG. 1, the excitation coil 19 may include eight or more turns. Further, the excitation coil 19 may include a dozen turns or more.

The excitation coil 19 is connected to a driving circuit 20, which is connected to an oscillating circuit 21 that oscillates at frequency f0. The CPU 18 transmits control signals to the selection circuit 12, the sample-hold circuit 16, the A/D conversion circuit 17, and the driving circuit 20.

Figure 2:
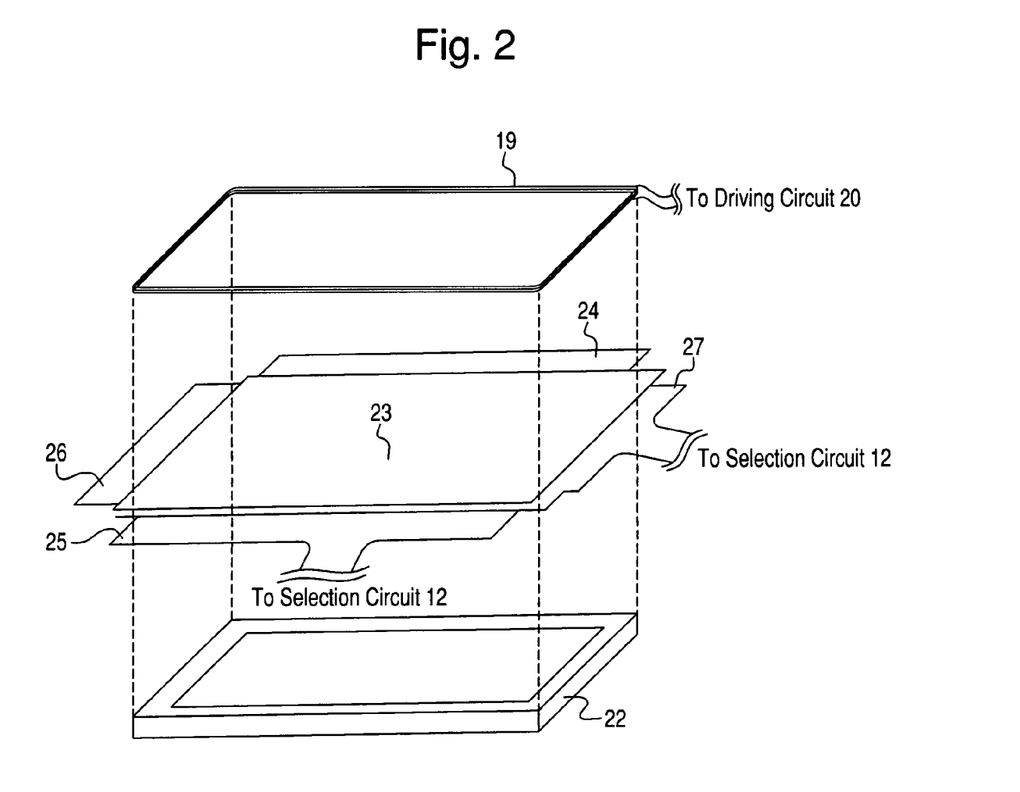
FIG. 2 is an exploded view illustrating the tablet of FIG. 1 according to an embodiment of the present invention.

FIG. 2 is a three-dimensional view illustrating a tablet in which an LCD device (panel) 22 and a glass-sensor 23 are provided.

The glass-sensor 23 is made of, for example, two glass sheets of about 0.4 mm in thickness stacked together, each of the glass sheets including a pattern of the loop-coil group 11 being formed thereon using an ITO film. Specifically, the pattern of the loop coils X1 to X40 may be formed on one glass sheet and the pattern of the loop coils Y1 to Y30 may be formed on the other glass sheet, for example, by an etching method. Then, the glass sheets are provided such that a transparent insulating sheet is disposed in between the surfaces of ITO films facing each other.

A flexible board 24 (first flexible board) made of a polyimide material is provided such that the pattern of each line of the loop coils X1 to X40 in the glass-sensor 23 is connected thereto and a turn-back portion making a loop is formed. Furthermore, a flexible board 25 (second flexible board) made of a polyimide material is provided such that the pattern of each line of the loop coils X1 to X40 in the glass-sensor 23 is connected thereto. Further, a terminal (first terminal) provided on the flexible board 25 is connected to the selection circuit 12.

Similarly, a flexible board 26 (third flexible board) made of a polyimide material is provided such that the pattern of each line of the loop coils Y1 to Y30 in the glass-sensor 23 is connected thereto and a turn-back portion making a loop is formed. Furthermore, a flexible board 27 (fourth flexible board) made of a polyimide material is provided such that the pattern of each line of the loop coils Y1 to Y30 in the glass-sensor 23 is connected thereto. Further, a terminal (second terminal) provided on the flexible board 27 is connected to the selection circuit 12.

Figure 3:
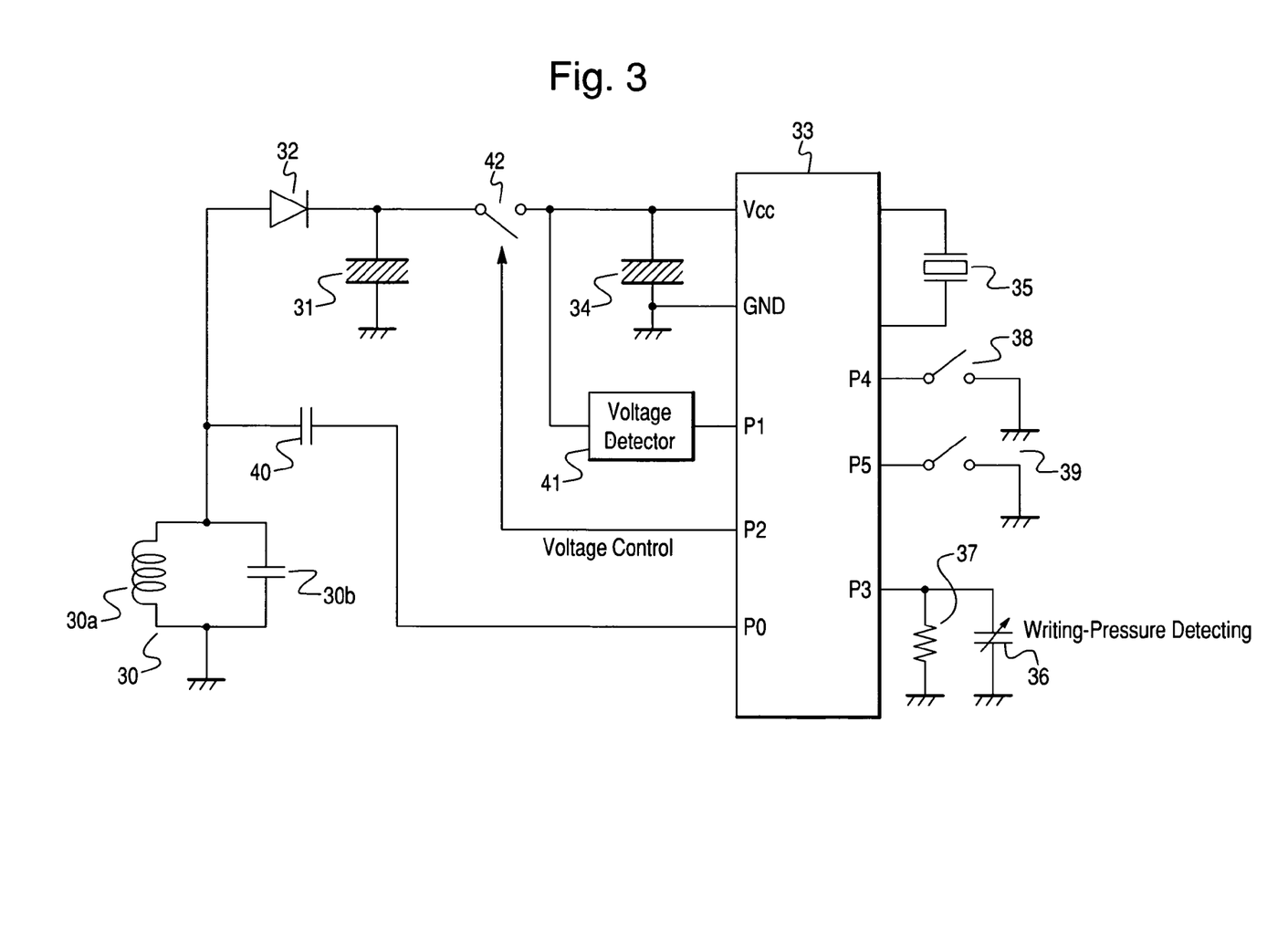
FIG. 3 is a circuit diagram illustrating a position pointer associated with a position detecting device and computer according to an embodiment of the present invention.

FIG. 3 is a circuit diagram illustrating a position pointer associated with a position detecting device and a computer according to an embodiment of the present invention.

Figure 4:
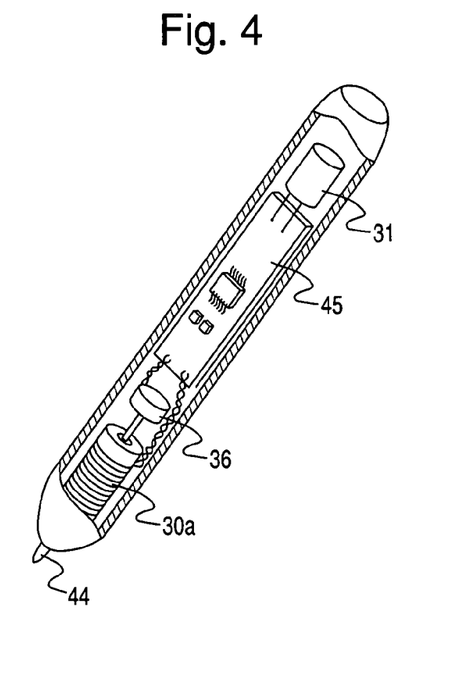
FIG. 4 illustrates an internal structure of the position pointer of FIG. 3.
Figure 5:
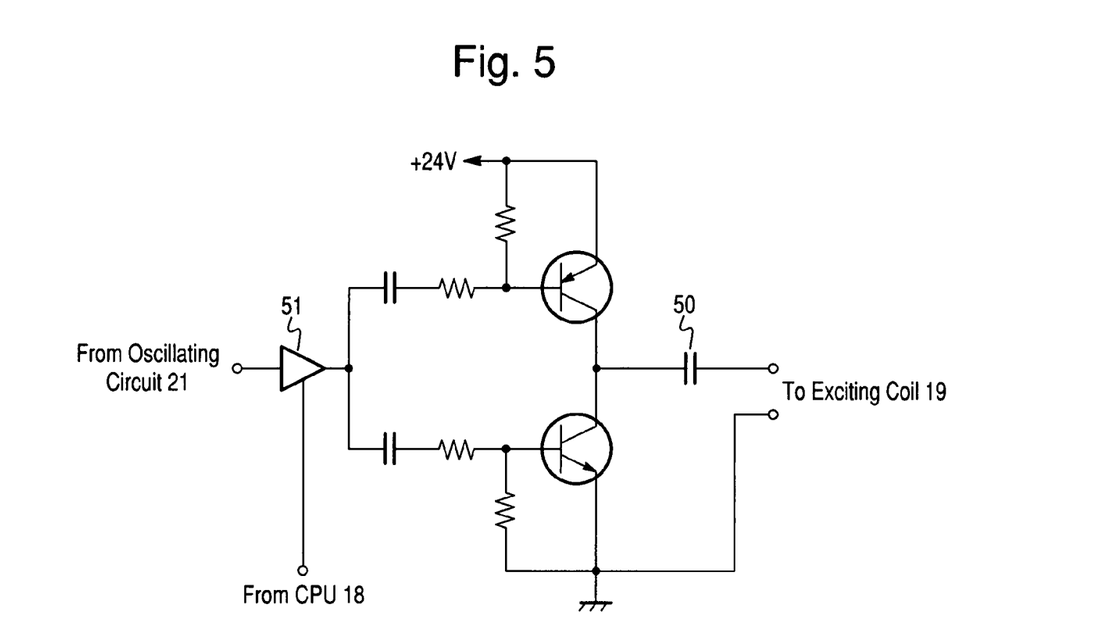
FIG. 5 is a circuit diagram illustrating a driving circuit of the tablet of FIG. 1 according to an embodiment of the present invention.

The position detecting device and computer according to the present embodiment of the invention may include the tablet of FIGS. 1, 2, and 5 and the position pointer of FIGS. 3 and 4.

In FIG. 3, a coil 30a and a capacitor 30b are provided as a resonant circuit 30 of a resonant frequency f0. Also, an electric double-layer capacitor 31 and a diode 32 are configured so that a voltage generated in the resonant circuit 30 by an alternating magnetic field transmitted from the excitation coil 19 of the tablet is rectified by the diode 32 to charge the electric double-layer capacitor 31 with the rectified voltage.

A micro processor 33 including a ROM (Read Only Memory) and a RAM (Random Access Memory) is provided to perform operations according to a predetermined program. Also, an aluminum-electrolytic capacitor 34 keeps a power supply voltage of the micro processor 33 constant. An oscillating element 35 generates a clock signal of the micro processor 33, and also generates a signal of frequency f0 to be transmitted from the resonant circuit 30 to the tablet.

Also, a variable capacitor 36 has a capacity that is varied by a writing pressure when a user pushes a tip of the position pointer on the tablet. The variable capacitor 36 detects the writing pressure as a digital value by measuring a discharge time that depends on a time constant between the variable capacitor 36 and a resistor 37. Accordingly, the digital value of the writing pressure is provided to the micro processor 33 (at terminal P3) by operation of the variable capacitor 36 and the resistor 37.

Further, switches 38 and 39 may be provided on a side surface of the position pointer. Accordingly, information about mode-setting and the like input by a user by operation of the switches 38 and 39 can be supplied to the micro processor 33 (at terminals P4 and P5, respectively).

Further, a capacitor 40 supplies a signal of the frequency f0 provided by the micro processor 33 (from terminal P0) to the resonant circuit 30. A voltage detector 41 outputs a signal that indicates whether a voltage at the aluminum-electrolytic capacitor 34 is a predetermined value or greater, and supplies the signal to the micro processor 33 (to terminal P1). Further, a switch 42 is provided to be switched ON/OFF between the electric double-layer capacitor 31 and aluminum-electrolytic capacitor 34 based on a control signal (Voltage Control signal from terminal P2) from the micro processor 33.

FIG. 4 illustrates an internal structure of the position pointer of FIG. 3. As illustrated in FIG. 4, the position pointer includes a pen-shaped housing, a tip 44 extending from an end of the housing, and the coil 30a of the resonant circuit 30 (see FIG. 3) of frequency f0, in which wires are coiled around a hollow cylindrical-shaped ferrite material. A pressure applied to the tip 44 is transmitted to the variable capacitor 36 to be detected. In addition, a circuit board 45 having the circuits illustrated in FIG. 3 disposed thereon is arranged in the housing adjacent to the variable capacitor 36. The electric double-layer capacitor 31 is installed on the circuit board 45.

FIG. 5 is a circuit diagram illustrating the driving circuit 20 of the tablet of FIG. 1, according to an embodiment of the present invention. A capacitor 50 and the excitation coil 19 in FIG. 1 form a resonant circuit of frequency f0 in the tablet. A three-state buffer 51 having a CMOS structure passes or does not pass the signal of frequency f0 supplied by the oscillating circuit 21 in FIG. 1. A control terminal of the three-state buffer 51 is connected to the CPU 18 in FIG. 1, which controls a supply of electric current. to the excitation coil 19 (i.e., to be ON/OFF) by controlling the operation mode of the three state buffer 51.

The circuit illustrated in FIG. 5 may be operated by a positive direct current (DC) voltage of, for example, 24V. Accordingly, an alternating voltage in the range of about 70 Vpp to 100 Vpp (peak to peak voltage) may be generated at both ends of the excitation coil 19.

When the position pointer illustrated in FIG. 4 is moved in proximity with the excitation coil 19 while the alternating current is being generated in the resonant circuit (including the capacitor 50 and the excitation coil 19) of the tablet, a voltage is generated in the resonant circuit 30 of the position pointer by the alternating magnetic-field signal of the excitation coil 19. The voltage generated in the resonant circuit 30 is then rectified in the diode 32 (see FIG. 3) to be supplied to the electric double-layer capacitor 31 such that the electric double-layer capacitor 31 can be charged rapidly.

The operation of the position pointer will now be described in more detail. First, referring to FIG. 3, the voltage detector 41 and the switch 42 operate to keep the voltage at the aluminum-electrolytic capacitor 34 constant (e.g., 1.8V).

Specifically, in the circuit in FIG. 3, the voltage detector 41 outputs a high voltage level (logic high) if an input voltage (i.e., the voltage at the aluminum-electrolytic capacitor 34) is 1.8V or greater. The voltage detector 41 outputs a low voltage level (logic low) if the input voltage is less than 1.8V. The micro processor 33 periodically reads a value at the terminal P1 to determine whether the voltage at the aluminum-electrolytic capacitor 34 is 1.8V or greater. Then, if the voltage at the aluminum-electrolytic capacitor 34 is less than 1.8V, the terminal P2 is made logic high during a predetermined period and the switch 42 is turned on (i.e., closed), accordingly.

In this manner, the micro processor 33 controls the switch 42 to be turned on such that the electric charge of the electric double-layer capacitor 31 is transferred to the aluminum-electrolytic capacitor 34. Hence, the voltage of the aluminum-electrolytic capacitor 34 is increased and the voltage is controlled to be maintained at approximately 1.8V.

Further, the predetermined period of time during which the switch 42 is turned on may be made short (e.g., several microseconds to several tens of microseconds). The voltage at the aluminum-electrolytic capacitor 34 may be set to 1.8V, which, in this case, may correspond to a minimum voltage to operate the micro processor 33. However, it should be understood that the voltage at the aluminum-electrolytic capacitor 34 may be set to other voltages (e.g., 2.5V, 3.3V, 5V, etc.) according to system requirements.

Figure 6:
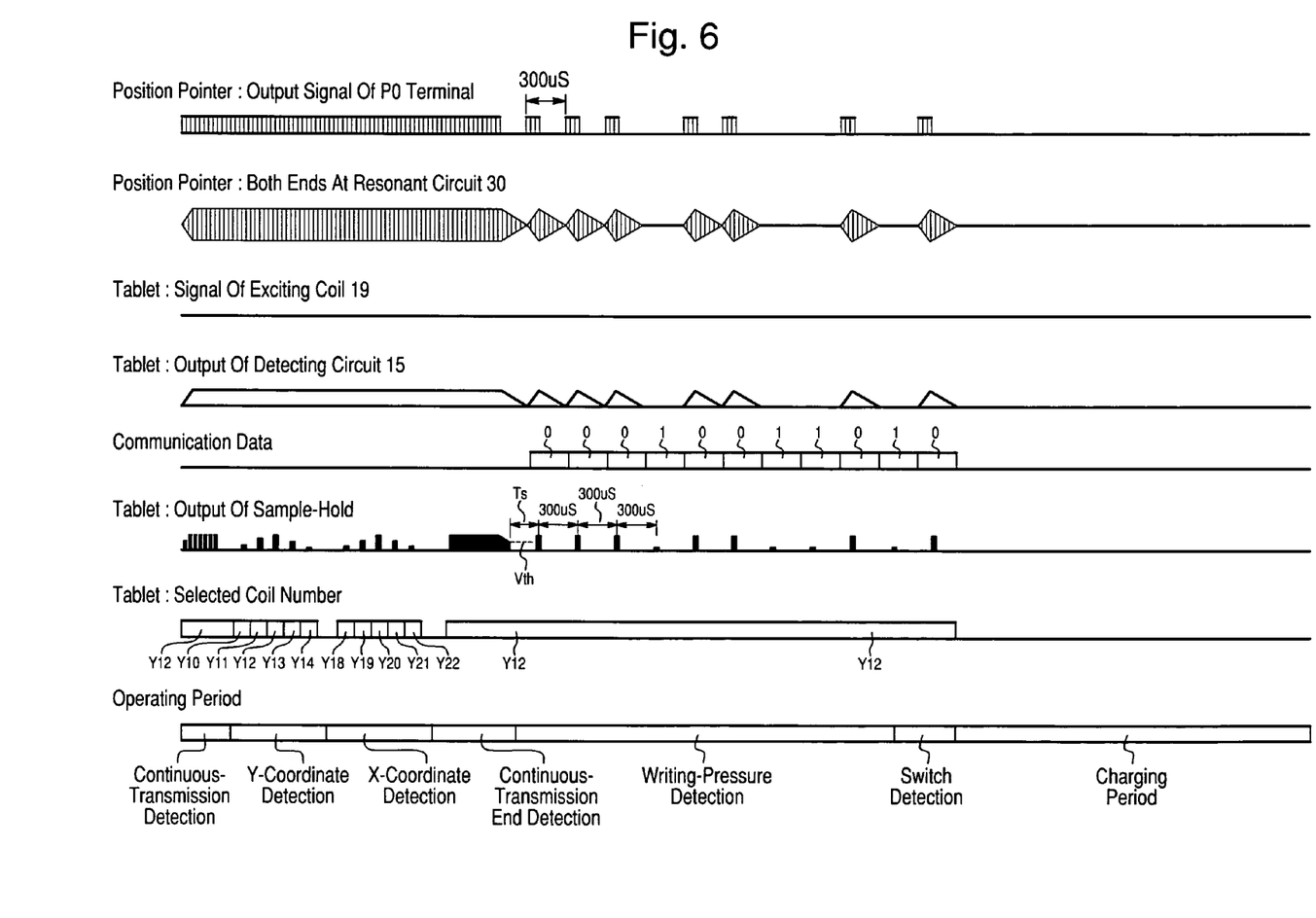
FIG. 6 is a signal diagram illustrating operations of the position pointer and the tablet when electric charging is not performed.
Figure 7:
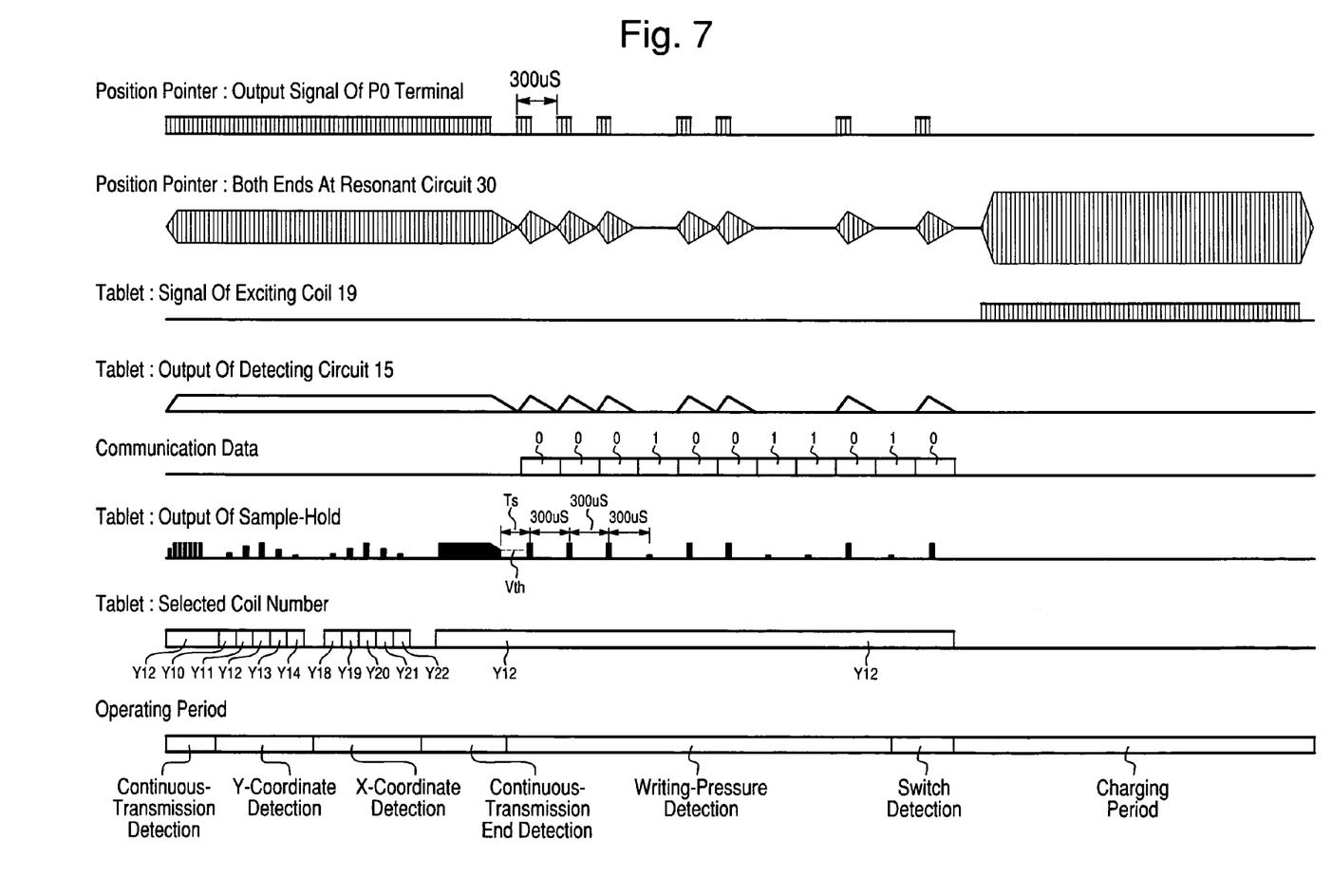
FIG. 7 is a signal diagram illustrating operations of the position pointer and the tablet when electric charging is performed.

FIGS. 6 and 7 are signal diagrams illustrating a waveform and operational condition of the components of the position pointer and the tablet. A charging operation may be performed when a position being pointed to (indicated) by the position pointer is near the excitation coil 19, namely, when the position pointer is in a peripheral portion of the position detecting area. Here, the position detecting area may correspond to the display area of the display device (e.g., the LCD panel 22 of FIG. 2).

FIG. 6 illustrates a waveform and operational condition of the position pointer and the tablet when the position pointer is not in the peripheral portion, and FIG. 7 illustrates a waveform and operational condition of the position pointer and the tablet when the position pointer is in the peripheral portion of the position detecting area.

In FIGS. 6 and 7, the first line and the second line illustrate a state of signals transmitted from the coil 30a of the position pointer. In this case (as an example), the micro processor 33 (see FIG. 3) detects the writing pressure applied to the variable capacitor 36 (see FIGS. 3 and 4) and converts the writing pressure into 9 bits of digital data. The microprocessor 33 then outputs 11 bits of data including the 9 bits representing the writing pressure and 2 bits of data representing a detected operational condition of the switches 38 and 39 from the terminal P0. The 11 bits of data are transmitted from the resonant circuit 30 to the table during a data transmission period including a writing-pressure detection period and a switch detection period. It should be noted that the signal output from the terminal P0 is a carrier wave of a frequency f0 which has been modulated by the digital data (11 bits)

The signal of the frequency f0 is supplied to the resonant circuit 30 via the capacitor 40 and is transmitted from the coil 30a to the tablet. Further, this output is intermittent transmission at a predetermined cycle (e.g., 300 microseconds), in which values of data (i.e., the 11 bits described above) are represented as follows: when a data bit is a "0", the signal (signal pulse) is transmitted in the predetermine cycle and when a data bit is a "1", the signal (signal pulse) is not transmitted in the predetermined cycle.

A method of converting the writing pressure applied to the variable capacitor 36 to a digital value is known to those of ordinary skill in the art. For example, Japanese Published Patent Application No. 07-175572 describes a method of converting pressure of a variable capacitor to digital data. Therefore, a description of this conversion will not be provided here.

Furthermore, regarding the signal transmitted from the coil 30a, a sufficiently long and continuous transmission period (e.g., about 2 to 4 milliseconds) is provided prior to the transmission of the 11 bits of data (the data transmission period) in order to facilitate the detection of data head by the tablet. The data transmission period includes the writing-pressure detection period (9 bits) and the switch detection period (2 bits). After the transmission of the 11 bits of data is performed, the micro processor 33 stops transmission of the signal during a charging period (e.g., 2 milliseconds). The micro processor 33 then repeats the operations of the continuous-transmission period, the data transmission period, and the charging period.

During the continuous-transmission period, the position pointer outputs a continuous transmission signal such that the position of the position pointer can be detected by the loop coil group 11 (see FIG. 1) of the tablet. The continuous transmission signal may have the frequency f0 and may be generated by the oscillating element 35. The continuous transmission period may include a Y-coordinate detection period and an X-coordinate detection period.

As can be seen from a comparison of FIG. 6 and FIG. 7, when the position pointer is positioned in the peripheral portion of the position detecting area, the excitation coil 19 outputs a charging signal during the charging period. Otherwise, the charging signal is not output from the excitation coil 19.

It should be understood that although the embodiments of the present invention illustrate and describe an example in which 11 bits (9 bits for writing pressure and 2 bits for switches 38 and 39) are transmitted to the tablet during specific times along with position data, this arrangement is not intended to limit the scope of the present invention. For example, one of ordinary skill in the art will recognize that the position pointer may, in some embodiments, not include the switches 38 and 39, in which case the 2 bits would not be necessary. Additionally, more bits or less bits may be used to define the writing pressure with more resolution or less resolution, respectively.

Figure 8:
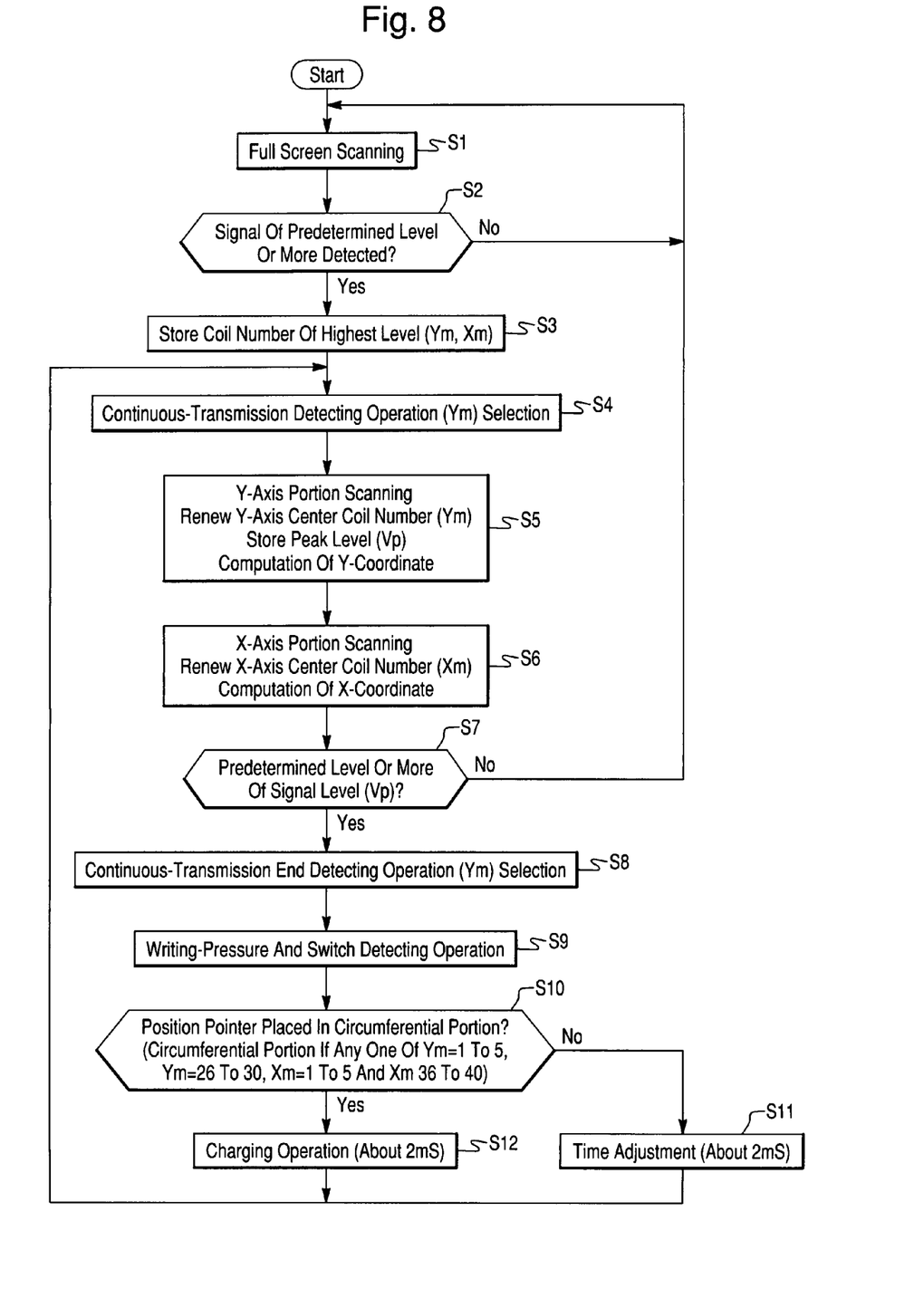
FIG. 8 is a flow chart illustrating a method of operation of a tablet associated with a position detecting device and computer according to an embodiment of the present invention.

FIG. 8 is a flow chart illustrating a method of operation of the tablet and the position pointer when the position pointer is placed on the tablet. The method of FIG. 8 may be performed by the CPU 18 in FIG. 1. Accordingly, the method of FIG. 8 will be described below with reference to FIGS. 1 to 7.

The CPU 18 performs a full-screen scanning in which a control signal is output to the selection circuit 12 and each coil of X1 to X40 and Y1 to Y30 is selected, one by one, to detect an approximate location of the position pointer with respect to the tablet (step S1). Step 1 corresponds to the continuous-transmission period illustrated in FIGS. 6 and 7. The full-screen scanning may be performed in accordance with methods that are known in the art, therefore a detailed description of this step will not be provided here. However, since the transmission from the position pointer is intermittently executed as mentioned above, it is preferable that one loop coil is selected and the signal thereof is received continuously for a longer time than the cycle of transmission from the position pointer.

Next, it is determined whether a signal level of a predetermined value is detected from the selected loop coil (step S2).

At this time, if the signal level of the predetermined value or greater is not detected from any one of loop coils (No at step S2), it is determined that the position pointer is not located on the tablet and the full screen scanning is repeated in the step S1.

On the other hand, if the signal level of the predetermined value or greater is detected from an arbitrary loop coil (Yes at step S2), the loop coil(s) determined to be nearest to the position pointer in the full-screen scanning is stored as values of Xm representing the closest X loop coil (selected from X1 to X40) and Ym representing the closest Y loop coil (selected from Y1 to Y30)(step S3). The steps S1 to S3 may be an initialization process.

Here, assuming that the position pointer is initially located near an intersection point of the loop coils X20 and Y12, and the operation will be described, accordingly with reference to FIG. 6. Specifically, FIG. 6 illustrates operations in which the position pointed to by the position pointer is obtained and the 11-bit operational information transmitted from the position pointer is detected.

The CPU 18 controls the selection circuit 12 to select the loop coil Y12 to detect the start of the continuous transmission signal from the position pointer (step S4). When the start of the continuous transmission signal is being detected, the sample-hold circuit 16 is continuously operated at intervals that are sufficiently shorter than the intermittent-transmission cycle described above and it is continuously determined whether a signal level detected during each interval is the predetermined value or greater continuously. When the signal level of the predetermined value or greater is continuously detected for a time that is sufficiently longer than the intermittent-transmission cycle described above, it is determined that the operation of the position pointer has started the continuous-transmission period.

Once it has been determined that the operation of the position pointer has started the continuous-transmission period, the CPU 18 begins a Y-axis portion scanning for detecting a Y-coordinate (step S5). In other words, the CPU 18 controls the selection circuit 12 to select a loop coil Y10, and further controls the sample-hold circuit 16 to detect the signal level corresponding to the selected loop coil Y10. Similarly, loop coils from Y11 to Y14 are also selected, one by one, and each corresponding signal level is detected. Based on the initial assumption provided above, the highest signal level is detected when the loop coil Y12 is selected such that as the selection circuit 12 selects coils further away from the Y12, the detected signal level decreases.

Accordingly, a Y-coordinate value at a position on the tablet pointed to (indicated) by the position pointer can be obtained by computing a distance between respective coils by an interpolation method based on a distribution of the detected level of the loop coils Y10 to Y14.

Since interpolation methods are known to those of ordinary skill in the art, a detailed description of the computation using the interpolation method will not be provided here.

If a peak of detected signal levels of the loop coils Y10 to Y14 is not the detected signal level of the Y12, it is determined that the position pointer has moved. Accordingly, a value Ym, that is, the stored value of the loop coil nearest to the position pointer is updated (renewed). Furthermore, the peak level (Vp) is stored The peak level (Vp) represents the highest detected signal level of the Y-axis coil of value Ym (i.e., nearest to the position pointer).

After the Y-coordinate value is obtained at the step S5, the CPU 18 controls the selection circuit 12 to select loop coils from X18 to X22, one by one, and an X-axis portion scanning is performed to obtain an X-coordinate value based on the signal-level distribution obtained similar to the Y-axis (step S6). Then, an X-coordinate value at a position on the tablet pointed to (indicated) by the position pointer can be obtained by computing the distance between respective coils by an interpolation method based on the distribution of the detected signal level of the loop coils X18 to X22. Also, a value Xm, that is, the stored value of the loop coil nearest to the position pointer is updated (renewed) similar to the Y-axis.

Further, it is determined whether a peak level (Vp) obtained by the Y-axis portion scanning is greater than or equal to a predetermined value (step S7). Then, if the peak level (Vp) is not greater than or equal to the predetermined value (No at step S7), it is determined that the position pointer is not positioned on the tablet, and the CPU 18 returns the operation to the step S1 and restarts the position detection from the full screen scanning.

Thus, coordinates on the tablet pointed to (indicated) by the position pointer are obtained.

Once the coordinates of the position pointer are obtained, the CPU 18 starts a continuous-transmission end detecting operation (step S8). The continuous-transmission end detecting operation is one of the operations for detecting data sequentially transmitted from the position pointer with an accurate timing and without error by accurately detecting a timing at which the operation within the position pointer enters the intermittent-transmission period from the continuous-transmission period.

In other words, at the step S8, the CPU 18 controls the selection circuit 12 to select the loop coil of the loop-coil number Ym updated in the step S5. The CPU 18 then controls the sample-hold circuit 16 to detect the signal level. Also, in this step S8, the sample-hold circuit 16 and the A/D conversion circuit 17 are operated repeatedly, and a time (Ta) at which the detected signal level equals about half the peak level (Vp) is detected. The time (Ta) may represent the continuous transmission end time (i.e., an end of the continuous transmission period).

Further, after the continuous transmission from the position pointer has ended, a total of 11 bits of data indicating the writing pressure and the operational information of the switches 38 and 39 is transmitted from the position pointer with a cycle of 300 microseconds per bit. As described above, the 11 bits of data are communicated by transmitting a signal pulse or not transmitting a signal pulse during the respective cycles.

The CPU 18 begins a writing-pressure and switch detecting operation (step S9). Here, the CPU 18 operates the sample-hold circuit 16 and the A/D conversion circuit 17 at a time when a predetermined time (Ts) has passed from the continuous-transmission end time (Ta) obtained at the step S8, thereby detecting the signal level to determine the data bits being received from the position pointer. (Ts) represents an intermittent transmission cycle of the position pointer. As can be seen from FIGS. 6 and 7, the position pointer transmits each of the 11 data bits during respective cycles defined by (Ts) (e.g., 300 us).

If the signal level detected at this time is equal to or greater than half the peak level (Vp), the CPU 18 determines that a first bit (least significant bit) of writing-pressure data transmitted from the position pointer is a "0". If the signal level detected at this time is less than half the peak level (Vp), the CPU 18 determines that the first bit is a "1". In this case, the predetermined time Ts is a value that may be obtained in advance, for example, by an experiment or a predetermined calculation such that the voltage in the detecting circuit 15 is detected at the time around where a maximum thereof occurs when the transmission data received from the position pointer is a "0".

Subsequently, in order to receive a second bit of the writing-pressure data transmitted from the position pointer, the CPU 18 operates the sample-hold circuit 16 and the A/D conversion circuit 17 at the time when 300 microseconds (that is, the intermittent-transmission cycle of the position pointer) has passed since the time when the sample-hold operation was performed last, thereby detecting the signal level. Then, the second bit of the writing pressure data transmitted from the position pointer is similarly obtained based on the detected signal level at this time. Further, the CPU 18 detects the signal level while continuing the subsequent cycle of 300 microseconds. Accordingly, 9 bits of the writing pressure data and 2 bits of the operational information of the switches 38 and 39 are detected.

The sample-hold circuit 16 may be operated based on the intermittent-transmission cycle (Ts) to correspond to the transmission data signal received from the position pointer.

After the 9 bits of the writing pressure data and the 2 bits of the operational information of the switches 38 and 39 are detected at the step S9, the position pointer enters a transmission-stop period of 2 milliseconds. During the transmission stop period, data is not transmitted from the position pointer and this time period is used for charging the position pointer (i.e., the charging period). In the charging period, the CPU 18 determines whether the position pointed to by the position pointer is in the peripheral portion of the position detecting area based on the loop-coil numbers Xm and Ym obtained at the steps S5 and S6 (step S10).

In the present embodiment, if either an X-axis loop-coil number of the closest X-axis loop coil or a Y-axis loop-coil number of the closest Y-axis loop coil is within five loop coils from an edge of the loop coil group 11, it is determined that the position pointer is in the peripheral portion of the position detecting area.

In this case, according to the above initial assumption, the loop-coil numbers are Ym=12 and Xm=20, therefore, the position pointer is not in the peripheral portion (step S10=No). As a result, the charging operation is not performed (see FIG. 6). Then, after a time adjustment of about 2 milliseconds (step S12), the CPU 18 returns to the step S4 and performs the operation to detect a continuous transmission signal from the position pointer again in order to detect the position of the position pointer.

FIG. 6 illustrates the waveform and operational condition of the position pointer and tablet when the position pointed to (indicated) by the position pointer is not in the peripheral portion.

On the other hand, FIG. 7 illustrates the case in which the position pointed to by the position pointer is in the peripheral portion of the position detecting area(step S10=Yes). For example, FIG. 7 illustrates the operation when the position pointer is placed in the vicinity of a loop-coil number X39. In this case, in order to execute the charging operation in the period of about 2 milliseconds at the step S12, the CPU 18 controls the driving circuit 20 to output an excitation signal (i.e., the charging signal) of frequency f0 from the excitation coil 19. The CPU 18 then returns to the step S4, and the operation of detecting a continuous transmission signal from the position pointer is performed again.

It should be noted that the electric power generated in the coil 30a of the position pointer by the excitation signal is considerably stronger than the electric power at the time of normal operation. Therefore, the electric double-layer capacitor 31 is charged through the diode 32. Also, the electric double-layer capacitor 31 can be charged in a short amount of time of several seconds to several tens of seconds. Moreover, since the electric double-layer capacitor 31 may have a large capacity, the electric double-layer capacitor 31 can be used continuously over several tens of minutes to several hours once it is charged.

Therefore, in the present embodiment, after bringing the position pointer to the peripheral portion for only ten seconds or so, continuous use of the position pointer at a center portion of the position detecting area for about an hour or so becomes possible (i.e., without recharging). However, since it is unlikely that a user will operate the position pointer only at the center portion of the position detecting area continuously for hours, an operator can use the position pointer continuously without particular attention to the charging operation.

It should be noted that in the present embodiment, electric charging is performed when the position pointer is in the peripheral portion. The reason for this is that effective charging is not performed when the position pointer is away from the excitation coil 19. Accordingly, the efficiency of the charging operation is improved by avoiding unnecessary electric current being supplied to the excitation coil 19. Thus, energy can be conserved. Further, although electric power is extracted by a single diode (i.e., the diode 32) in the present embodiment, it should be understood that full-wave rectification may be performed using two or more diodes.

Although the charging period is shown and described in previous embodiments as being after the continuous transmission period and the data transmission period, the charging period may be provided between individual bits of the data transmission.

Furthermore, although the electric double-layer capacitor 31 is used as the power storage unit for the position pointer, a nickel-cadmium cell may alternatively be used. Other types of capacitors may also be used with the present invention.

It should be understood that the specifics of the loop coil group 11 and the excitation coil 19 as shown and described herein are not intended to limit the scope of the present invention. The embodiments of the present invention may be used with more or less loop coils. Additionally, the peripheral portion may be arbitrarily defined with reference to loop coil positions and/or numbers.

A position detecting device according to embodiments of the present invention includes a position pointer which transmits a position-pointing signal using a power supply stored in a rechargeable power storage unit, and a tablet which detects a position pointed to by the position pointer when receiving the position-pointing signal. The position pointer includes a coil, a charging circuit for charging the rechargeable power storage unit, and a transmitter for transmitting the position-pointing signal. The tablet includes an excitation coil wound around a periphery of a position detecting area, an excitation circuit that supplies an alternating voltage to the excitation coil, a position-pointing signal detector that detects the position-pointing signal received from the position pointer, and an excitation controller that controls a supply of the alternating voltage to the excitation coil based on the detected position-pointing signal. Accordingly, the position pointer does not require a battery change and does not require attention to an electric-charging operation, yet the position pointer can transmit a strong signal using a simplified configuration. Also, the tablet has sensor coils which can be arranged on a front surface of a liquid crystal panel.

Further, according to embodiments of the present invention, a computer is provided. The computer includes a position detecting device having a position pointer which transmits a position-pointing signal using a power supply stored in a rechargeable power storage unit and a tablet which detects a position pointed to by the position pointer when receiving the position-pointing signal. The position pointer includes a coil, a charging circuit for charging the rechargeable power storage unit, and a transmitter for transmitting the position-pointing signal. The tablet includes an excitation coil wound around a periphery of a position detecting area, an excitation circuit that supplies an alternating voltage to the excitation coil, a position-pointing signal detector that detects the position-pointing signal received from the position pointer, and an excitation controller that controls a supply of the alternating voltage to the excitation coil based on the detected position-pointing signal. Accordingly, the position pointer does not require a battery change and does not require attention to be paid to the electric-charging operation, yet the position pointer can transmit a strong signal using a simplified configuration. Also the tablet has sensor coils which can be arranged on a front surface of a liquid crystal panel. Consequently, an improved computer can be provided.

The present invention may be embodied as executable code in computer readable media including storage media such as magnetic storage media (ROMs, RAMs, floppy disks, magnetic tapes, etc.), optically readable media (CD-ROMs, DVDs, etc.), and carrier waves (transmission over the Internet). For example, the computer readable media may contain an executable code for operation by the CPU 18 of FIG. 1.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A position detecting device, comprising:
    a position pointer to transmit a position-pointing signal using power supplied from a rechargeable power storage unit of said position pointer; and
    a tablet to detect a position pointed to by said position pointer using the position-pointing signal transmitted from said position pointer,
    wherein said position pointer comprises,
        a coil for generating power from an alternating magnetic field transmitted from an excitation coil of said tablet,
        a charging circuit for charging said rechargeable power storage unit using the power transmitted through said coil of said position pointer, and
        a transmitter for transmitting the position-pointing signal to said tablet, and wherein said tablet comprises
        said excitation coil wound around a periphery of a position detecting area of said tablet,
        an excitation circuit to drive said excitation coil for generating the alternating magnetic field, a position-pointing signal detector to detect the position-pointing signal from said position pointer, and an excitation controller to control said excitation circuit to cause said excitation coil to generate the alternating magnetic field based on a determination that said position pointer is in a peripheral portion within said position detecting area and to cause the excitation coil not to generate the alternating magnetic field based on a determination that said position pointer is in a central portion of said position detecting area, said peripheral portion surrounding said central portion being defined by specific x and y coordinates within said position detecting area, the determinations being made based on detection of said specific x and y coordinates of the position-pointing signal by said position-pointing signal detector, said excitation controller controlling said excitation circuit to cause said excitation coil to generate the alternating magnetic field for charging said rechargeable power storage unit using said charging circuit when the determination is that said position pointer is in said peripheral portion within said position detecting area of said tablet, wherein said excitation controller initiates a charging operation for a predetermined period of time when said position pointer is located in said peripheral portion and initiates a transmission stop when said position pointer is not located in said peripheral portion.

2. The position detecting device according to claim 1, wherein said tablet is integrally foamed with a display device.

3. The position detecting device according to claim 1, wherein said position pointer further comprises a resonant circuit configured with said coil and a capacitor for receiving the power from said tablet using the alternating magnetic field.

4. The position detecting device according to claim 3, wherein said resonant circuit is shared as said transmitter for transmitting said position-pointing signal to said tablet.

5. The position detecting device according to claim 1, wherein the rechargeable power storage unit of said position pointer is an electric double-layer capacitor.

6. The position detecting device according to claim 1, wherein said position pointer further comprises a processing unit driven by a predetermined voltage that controls said transmitter, a voltage detector used for maintaining said predetermined voltage, and a switch connected to said rechargeable power storage unit, and wherein the ON/OFF operation of said switch is controlled by said processing unit for maintaining said predetermined voltage based on the voltage detection of said voltage detector.

7. The position detecting device according to claim 1, wherein said position pointer further comprises a microprocessor for performing operations comprising a continuous transmission period for facilitating detection of said position pointer by said tablet, a data transmission period for transmitting writing information from said position pointer to said tablet, and a position indicator charging period for permitting said excitation coil to charge said position indicator, wherein said position detecting device is configured to perform said operations while said position pointer is in said peripheral portion within said position detecting area.

8. A position detecting device comprising:
a display device;
a position pointer to transmit a position-pointing signal using power supplied from a rechargeable power storage unit of said position pointer; and a sensor to detect a position pointed to by said position pointer using the position-pointing signal received from said position pointer, wherein said position pointer comprises
a coil for generating power from an alternating magnetic field transmitted from an excitation coil of said sensor,
a charging circuit for charging said rechargeable power storage unit using the power transmitted through said coil, and
a transmitter for transmitting the position-pointing signal, and wherein said sensor comprises said excitation coil wound around a periphery of a position detecting area of said sensor,
an excitation circuit to drive said excitation coil for generating the alternating magnetic field,
a position-pointing signal detector to detect the position-pointing signal from said position pointer; and
an excitation controller to control said excitation circuit to cause said excitation coil to generate the alternating magnetic field based on a determination that said position pointer is in a peripheral portion within said position detecting area and to cause the excitation coil not to generate the alternating magnetic field based on a determination that said position pointer is in a central portion of said position detecting area, said peripheral portion being defined by specific x and y coordinates values surrounding said central portion, the determinations being made based on detection of the position-pointing signal by said position pointing signal detector, said excitation controller controlling said excitation circuit to cause said excitation coil to generate the alternating magnetic field for charging said rechargeable power storage unit using said charging circuit when the determination is that said position pointer is in said peripheral portion within said position detecting area of said sensor, wherein said excitation controller initiates a charging operation for a predetermined period of time when said position pointer is located in said peripheral portion and initiates a transmission stop when said position pointer is not located in said peripheral portion.

9. The position detecting device according to claim 8, wherein said position pointer further comprises a microprocessor for performing operations comprising a continuous transmission period for facilitating detection of said position pointer by said tablet, a data transmission period for transmitting writing information from said position pointer to said tablet, and a position indicator charging period for stopping transmission of said writing information and permitting said excitation coil to charge said position indicator, wherein said position detecting device is configured to perform said operations while said position pointer is in said peripheral portion within said position detecting area.

10. A method of operating a position detecting apparatus including a position pointer having a rechargeable power supply, comprising:
providing the position pointer to transmit a position-pointing signal using power supplied from a rechargeable power storage unit;
providing a display device including a sensor to detect a position pointed to by the position pointer using the position-pointing signal received from the position pointer,
the position pointer comprising a coil for generating power from an alternating magnetic field, a charging circuit for charging the rechargeable power storage unit using the power transmitted through the coil, and a transmitter that transmits the position-pointing signal to the sensor, and the sensor comprising an excitation coil wound around a periphery of a position detecting area of the sensor, an excitation circuit to drive the excitation coil for generating the alternating magnetic field, a position-pointing signal detector to detect the position-pointing signal from the position pointer, and an excitation controller for controlling the excitation circuit;

controlling the excitation circuit to cause the excitation coil to generate the alternating magnetic field based on a determination that the position pointer is in a peripheral portion within the position detecting area and to cause the excitation coil not to generate the alternating magnetic field based on a determination that the position pointer is in a central portion of the position detecting area, the peripheral portion being defined by specific x and y coordinates surrounding the central portion, the determinations being made based on detection of the position-pointing signal by the position pointing signal detector, the excitation controller controlling the excitation circuit to cause the excitation coil to generate the alternating magnetic field for charging the rechargeable power storage unit using the charging circuit when the determination is that the position pointer is in said peripheral portion within said position detecting area of the sensor, initiating a charging operation for a predetermined period of time when said position pointer is located in said peripheral portion, and initiates a transmission stop when said position pointer is not located in said peripheral portion.

11. The method according to claim 10, wherein said position 10 further comprises a resonant circuit configured with said coil and a capacitor for receiving the power from said tablet using the alternating magnetic field.

12. The method according to claim 10, wherein the position pointer further comprises a processing unit driven by a predetermined voltage that controls the transmitter, a voltage detector for maintaining the predetermined voltage, and a switch connected to the rechargeable power storage unit, the ON/OFF operation of the switch being controlled by the processing unit for maintaining the predetermined voltage based on the voltage detection of the voltage detector.

13. The method according to claim 10, wherein, when the position pointer is in the peripheral portion within the position detecting area, said method further comprises continuously transmitting a signal from the position pointer to the tablet, subsequently transmitting writing information to the tablet, and charging the position indicator with the excitation coil.

14. A computer system, comprising:
a display panel to display images on a display side thereof;
a central processing unit to control said display panel;
a position detecting device, comprising a position pointer to transmit a position-pointing signal using power supplied from a rechargeable power storage unit of said position pointer, and a tablet to detect a position pointed to by said position pointer using the position-pointing signal transmitted from said position pointer, wherein said position pointer comprises
a coil for generating power from an alternating magnetic field transmitted from an excitation coil of said tablet,
a charging circuit for charging said rechargeable power storage unit using the power transmitted through said coil, and
a transmitter for transmitting the position-pointing signal to said tablet, and wherein said tablet comprises
said excitation coil wound around a periphery of a position detecting area of said tablet,
an excitation circuit to drive said excitation coil for generating the alternating magnetic field,
a position-pointing signal detector to detect the position-pointing signal from said position pointer, and
an excitation controller to control said excitation circuit to cause said excitation coil to generate the alternating magnetic field based on a determination that said position pointer is in a peripheral portion within said position detecting area and to cause the excitation coil not to generate the alternating magnetic field based on a determination that said position pointer is in a central portion of said position detecting area, said peripheral portion being defined by specific x and y coordinated surrounding said central portion, the determination being made based on detection of the position-pointing signal by said position-pointing signal detector, said excitation controller controlling said excitation circuit to cause said excitation coil to generate the alternating magnetic field for charging said rechargeable power storage unit using said charging circuit when the determination is that said position pointer is in said peripheral portion within said position detecting area of said tablet, wherein said excitation controller initiates a charging operation for a predetermined period of time when said position pointer is located in said peripheral portion and initiates a transmission stop when said position pointer is not located in said peripheral portion.

15. The computer system according to claim 14, wherein said tablet is integrally formed with a display device.

16. The computer system according to claim 14, wherein said position pointer further comprises a resonant circuit configured with said coil and a capacitor for receiving the power from said tablet using the alternating magnetic field.

17. The computer system according to claim 14, wherein said position pointer further comprises a microprocessor for performing operations comprising a continuous transmission period for facilitating detection of said position pointer by said tablet, a data transmission period for transmitting writing information from said position pointer to said tablet, and a position indicater charging period for stopping transmission of said writing information and permitting said excitation coil to charge said position indicator, wherein said position detecting device is configured to perform said operations while said position pointer is in said peripheral portion within said position detecting area.

* * * * *